United States Patent
Bowers et al.

(10) Patent No.: US 6,196,579 B1
(45) Date of Patent: Mar. 6, 2001

(54) REAR IMPACT OCCUPANT PROTECTION SYSTEM

(75) Inventors: Paul A. Bowers, Ray, MI (US); Alexander Heilig, Waldstetten (DE)

(73) Assignees: TRW Vehicle Safety Systems Inc., Lyndhurst, OH (US); TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/159,654

(22) Filed: Sep. 24, 1998

(51) Int. Cl.$^7$ .................................................. B60R 21/32
(52) U.S. Cl. ........................................ 280/735; 280/730.1
(58) Field of Search .................................. 280/735, 734, 280/730.1

(56) References Cited

U.S. PATENT DOCUMENTS

| | | | |
|---|---|---|---|
| 5,202,831 | * 4/1993 | Blackburn et al. | 280/735 |
| 5,330,226 | * 7/1994 | Gentry et al. | 280/735 |
| 5,366,241 | 11/1994 | Kithil . | |
| 5,461,567 | 10/1995 | Kelley et al. . | |
| 5,466,001 | 11/1995 | Gotomyo et al. . | |
| 5,653,462 | * 8/1997 | Breed et al. | 280/735 |
| 5,670,853 | * 9/1997 | Bauer | 280/735 |

\* cited by examiner

*Primary Examiner*—Eric Culbreth
(74) *Attorney, Agent, or Firm*—Tarolli, Sundheim, Covell Tummino & Szabo L.L.P.

(57) ABSTRACT

A rear impact restraint system (10) for protecting a vehicle occupant (42) during a rear impact crash event includes a vehicle seat (12) having a seat back portion (28) and an actuatable rear impact occupant protection device (40). The system (10) also includes a sensor (46, 48, 50 or 52) for sensing the position of the occupant (42) positioned on the vehicle seat (12). The sensor (46, 48, 50 or 52) provides a signal indicative of the position of the occupant (42). A rear impact sensor (60) senses a rear impact crash event and provides a signal indicative thereof. A controller (44), in response to the first sensor signal, determines a condition according to the relative position of the occupant (42) with respect to the vehicle seat (12). The controller (44) selectively actuates the rear impact occupant protection device (40) in response to the rear impact sensor signal and the condition.

9 Claims, 4 Drawing Sheets

REAR IMPACT OCCUPANT PROTECTION SYSTEM

TECHNICAL FIELD

The present invention relates to a vehicle occupant protection system, and more particularly to a rear impact occupant protection system for protecting a vehicle occupant during a rear impact crash event.

BACKGROUND OF THE INVENTION

Typical rear impact restraint systems include seat belts and/or inflatable devices that are actuated in response to sensing a rear impact crash event. However, known rear impact restraint systems often are actuated regardless of whether a person is seated in the associated seat. In addition, such known systems may not adequately determine whether the vehicle occupant is properly positioned to benefit from actuation of the restraint device.

SUMMARY OF THE INVENTION

The present invention is directed to a rear impact occupant protection system for protecting a vehicle occupant during a rear impact crash event. The system includes a vehicle seat having a seat back portion and an actuatable rear impact occupant protection device for, when actuated, protecting the vehicle occupant during a rear impact crash event. A first sensor senses the position of an occupant positioned on the vehicle seat and provides a signal indicative of the position of the occupant. A rear impact sensor senses a rear impact crash event and provides a signal indicative of such a crash event. A controller, in response to the first sensor signal, determines a condition according to the relative position of the occupant with respect to the vehicle seat. The controller selectively actuates the rear impact occupant protection device in response to the rear impact sensor signal and the condition.

Another feature of the present invention is directed to a method for protecting a vehicle occupant positioned within an occupant compartment of a vehicle during a rear impact crash event. The method includes the steps of sensing the position of an occupant located on a seat within the vehicle occupant compartment and providing a signal indicative of the occupant position. A rear impact crash event is sensed and a signal indicative of the rear impact crash event is provided. In response to the occupant position signal, a condition is determined according to the relative position of the occupant with respect to the vehicle seat. An actuatable rear impact occupant protection device is selectively actuated in response to the condition and the rear impact crash event signal.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
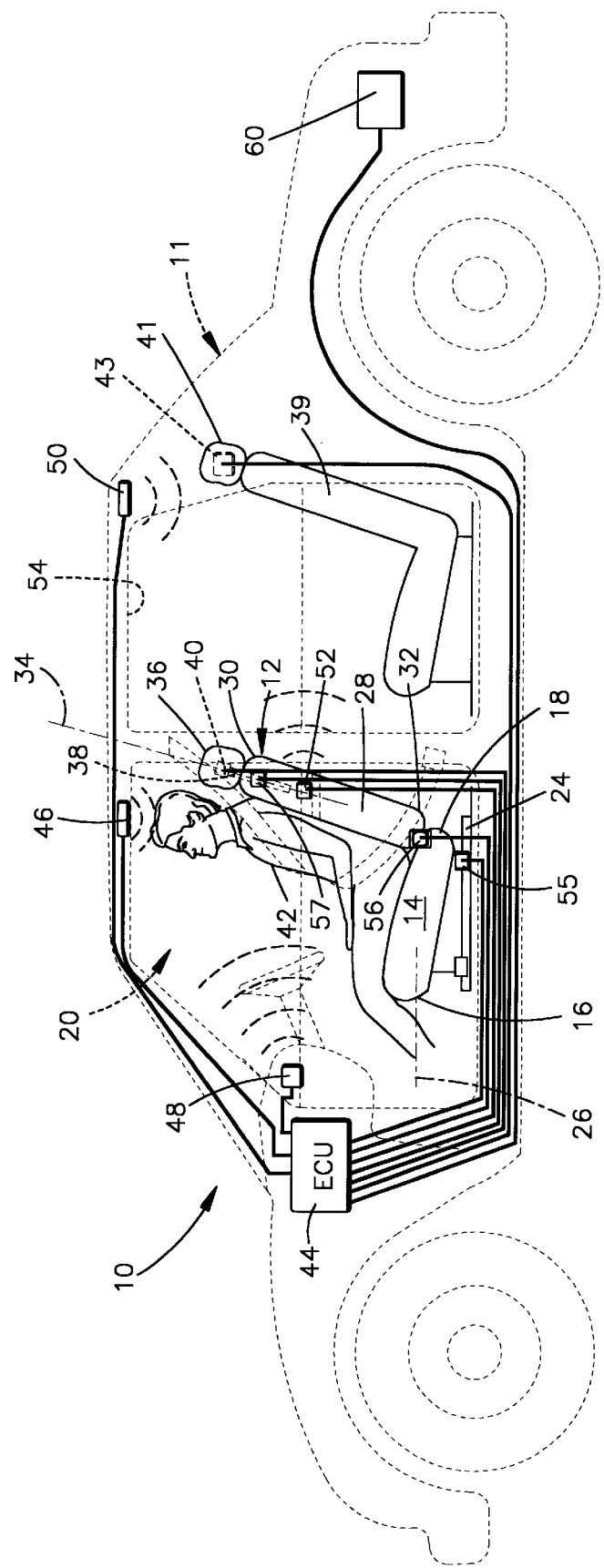
FIG. 1 is a schematic representation of a rear impact restraint system in accordance with the present invention.

FIG. 1 illustrates a preferred embodiment of a rear impact restraint system, generally indicated at 10, mounted within a vehicle 11. The system 10 includes a driver-side vehicle seat, indicated at 12, having a lower seat portion 14 with front and rear end portions 16 and 18, respectively. The lower seat portion 14 is adjustably mounted to a seat rail 24 for front-to-aft movement within the occupant compartment 20. The seat rail 24 is fixed to a lower body portion of the vehicle 11. An axis 26 extends through the respective front and rear end portions 16 and 18 of the seat 12. Thus, the front-to-aft position of the seat 12 may be adjusted along the axis 26 within the occupant compartment 20.

The seat 12 also includes a seat back portion 28 pivotally connected to and extending outwardly from the rear end 18 of the lower seat portion 14. The seat back portion 28 has an upper end 30, a lower end 32 and a seat back axis 34 extending through the upper and lower ends 30 and 32. Preferably, the seat 12 also includes a headrest 36 at the upper end 30 of the seat back portion 28. The headrest 36 may be fixed to the seat back portion 28. Alternatively, as shown in FIGS. 1 and 3–5, the headrest 36 may be vertically adjustable along the seat back axis 34, such as through an adjustable elongated connecting arm 38 insertable within the upper end 30 of the seat back portion 28. The vehicle 11 includes a front passenger seat (not shown) substantially identical to the driver-side seat 12 just described. The vehicle 11 also includes a rear seat 39 having one or more headrests 41.

The system 10 also includes an actuatable rear impact occupant protection device 40 for, when actuated, protecting a vehicle occupant 42 during a rear impact crash event. Preferably, each seat 12 and 39 has an associated rear impact occupant protection device 40 and 43, respectively. The occupant protection devices 40 and 43 are electrically connected to an electronic control unit (ECU) or controller 44, which controls the actuation of the protection devices 40 and 43. It will be understood that the occupant protection devices 40 and 43 also may be responsive to the controller 44 through an RF signal or an EMF signal, as a physical connection to the controller 44 is not necessary.

Each rear impact protection device 40 or 43 preferably is part of the headrest 36 or 41 of the seat 12 or 39, respectively, as shown in FIG. 1. For example, the protection device 40 may be an inflatable occupant protection device positioned within the headrest 36. Alternatively, the protection device 40 may be an actuatable mechanism configured to move the headrest 36 forward for restraining the head of the vehicle occupant 42 upon receiving an appropriate signal from the controller 44. Other known rear impact occupant protection devices, which may be part of the seat 12 or mounted in the roof of the vehicle 11, also may be used. A similar type of rear impact occupant protection device 43 may be positioned within the rear seat headrest 41, as well as in the other vehicle seats (not shown).

The system 10 includes at least one sensor device 46, and preferably a plurality of sensor devices 46, 48, 50 and 52 disposed about the vehicle occupant compartment 20. Each of the sensors 46, 48, 50 and 52 senses the position of an object, such as an occupant, a grocery bag or any other structure which may be positioned within the vehicle 11. Each of the sensors 46, 48, 50 and 52 is configured and arranged to detect the position of an occupant within a predetermined zone of the occupant compartment 20, such as on a vehicle seat 12 or 39. The sensors 46, 48, 50 and 52 also may sense the position of the vehicle seats 12 and 39.

Each of the sensors 46, 48, 50 and 52 is electrically coupled to the controller 44. The sensors 46, 48, 50 and 52 provide signals to the controller 44 indicative of the position of the occupant or object being sensed. Each sensor 46, 48, 50 and 52 may be any known sensing device capable of detecting the position of an occupant. For example, each sensor 46, 48, 50 and 52 might be an ultrasonic sensor, a capacitance sensor, a microwave sensor, an infrared sensor or an optical pattern recognition system.

In the preferred embodiment illustrated in FIG. 1, the sensors 46 and 50 are mounted within a roof 54 of the vehicle 11. The sensors 46 and 50 sense a vertical position of an occupant located on an adjacent seat 12 or 39. For example, the sensor 46 senses a distance from the occupant 42 located on the seat 12, such as the distance from the occupant's head, to the roof 54 of the vehicle 11 where the sensor 46 is positioned. The sensors 46 and 50 also may sense a horizontal position of an occupant within the vehicle occupant compartment 20. Such horizontal position may include, for example, a lateral, or side-to-side position of the occupant's head in the occupant compartment 20. The horizontal position also may include a front-to-aft position of an occupant in the occupant compartment 20.

The sensor 48 is illustrated as being part of the instrument panel of the vehicle 11 and may be used to identify the vertical positioning, or height, of an occupant positioned on the vehicle seat 12, such as the vertical position of the occupant's head. The sensor 48 also is capable of sensing the lateral and/or front-to-aft position of an occupant within the occupant compartment 20.

The sensor 52 is positioned within the seat back portion 28 and senses the vertical position, or height of an occupant positioned on the rear seat 39. The sensor 52 also may sense the lateral and/or front-to-aft position of an occupant located on the rear seat 39.

It will be understood and appreciated by those skilled in the art that the number of sensors is not critical to the structure or operation of the present invention. In fact, a single sensor appropriately mounted in the vehicle 11 may suffice, although a plurality of sensors is preferred.

As stated above, the position of the vehicle seat 12 may be sensed by sensors 46, 48, 50 and/or 52. In addition or as an alternative, the system 10 may include a seat position sensor 55 located at the seat rail 24. The sensor 55 is electrically coupled to the controller 44 for providing a signal indicative of the front-to-aft position of the seat 12. Another seat position sensor 56 may be located at the pivotal attachment between the upper seat portion 28 and the lower seat portion 14. The sensor 56 also is coupled to the controller 44 and provides a signal indicative of the angular position of the seat back portion 28 about its attachment to the lower seat portion 14. The controller 44 thus determines the position of the protection device 40 within the headrest 36 in response to the signals from the seat position sensors 55 and 56.

Where the seat 12 includes a vertically adjustable headrest 36, an additional sensor 57 determines the vertical position of the headrest 36 with respect to the seat back portion 28. The sensor 57 senses the amount of extension of the connecting arm 38. The sensor 57 also is electrically coupled to the controller 44. The sensor 57 provides a signal indicative of the position of the headrest 36 along the seat back axis 34. Similar seat position sensors may be used to sense the position of the front passenger seat (not shown) or the rear seat 39, if adjustable. Alternatively, the rear seat 39 may be fixed in the vehicle 11, with its position preprogrammed in the controller 44.

The system 10 also includes a rear impact sensor 60 for sensing a rear impact crash event. The rear impact sensor 60 is electrically coupled to the controller 44 for providing a signal indicative of a rear impact crash event. The rear impact sensor 60 may be any type of sensing device capable of detecting the occurrence of a rear impact crash event. For example, the rear impact sensor 60 may be an acceleration sensing device, such as an accelerometer, an impact sensing device, an inertia sensing device or any other device capable of sensing a rear impact crash event. In addition, rather than being positioned at the rear of the vehicle 11, as shown in FIG. 1, the rear impact sensor 60 might be a centrally located sensor having rear impact sensing capabilities.

Figure 2:
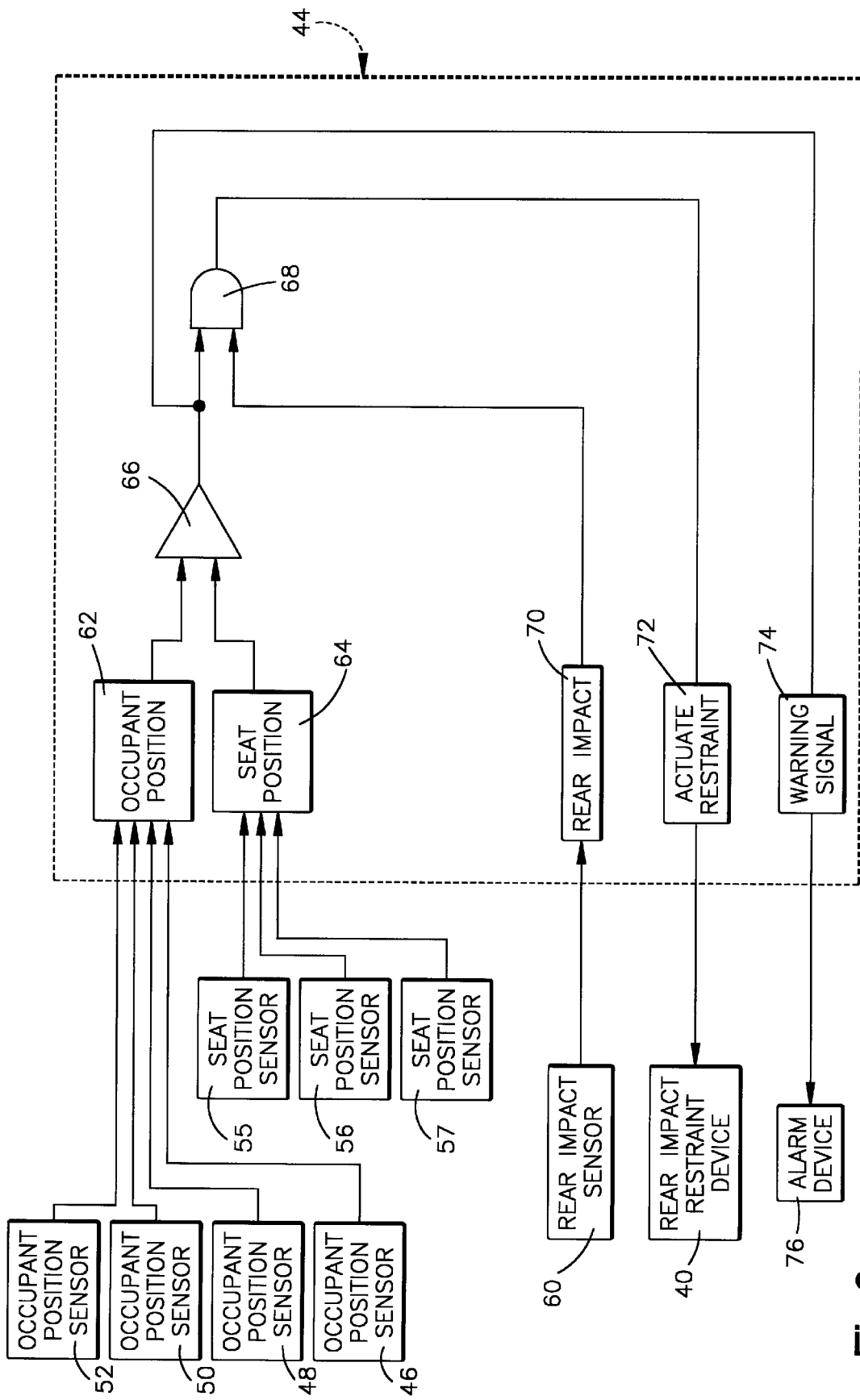
FIG. 2 is a functional schematic block diagram of the system of FIG. 1.

FIG. 2 illustrates an overview of the process used to control the rear impact occupant protection device 40 with respect to the driver-side seat 12. The elements shown within the controller block 44 correspond to operations performed internally by the controller 44. Each position sensor 46, 48, 50 and 52 provides a signal to the controller 44. The signals typically will be filtered to remove undesirable frequency components. At least some of the signals collectively reflect the position of an occupant, if any, positioned on the seat 12. The seat position sensors 55, 56 and 57 also provide signals to the controller 44 reflecting the position of the seat 12. The sensors 46, 48, 50 and/or 52 may also or alternatively be used to provide seat position information to the controller 44.

In response to the occupant position sensor signals, the controller 44 has an occupant position determining function 62 and a seat position determining function 64. The occupant position determining function determines, for example: (1) whether an object is located on the seat 12; (2) whether the object is a person; (3) the relative height of the occupant within the occupant compartment; and (4) the horizontal positioning of an upper portion of the occupant, such as an occupant's head. The seat position function 64 preferably determines the position of the front, top and side edges of the headrest 36. The occupant position and the seat position are thus determined and provided to a comparison function 66.

The controller 44 determines a condition according to the relative position of the occupant with respect to the position of the vehicle seat 12. Specifically, the comparison function 66 determines whether the relative position of the occupant 42 with respect to the position of the seat 12, preferably including the headrest 36, is within a predetermined threshold. Such thresholds for the occupant position versus seat position may be established through empirical testing for a particular vehicle. The thresholds may be stored, for example, in a look-up table of the controller 44. In general, the thresholds set forth predetermined actuation criteria for actuating the protection device 40.

The comparison function 66 has an output, which may be an enable condition or a disable condition. The condition indicates whether or not the relative position of the occupant 42 with respect to the headrest 36 of the seat 12 provides a situation in which actuation of the protection device 40 would be beneficial to the occupant 42. For example, the comparison function 66 provides a HIGH signal to enable the rear impact occupant protection device 40. Conversely, a LOW signal is provided when the occupant is out of position or when no occupant is present. A LOW signal from the comparison function 66 disables the protection device 40. The output of the comparison function 66 is provided to an input of a Boolean AND function 68.

The rear impact sensor 60 also provides a rear impact sensor signal to the controller 44. The controller 44 includes a rear impact crash event determining function 70. In response to the rear impact sensor signal, the rear impact determining function 70 determines whether a rear impact crash event exists for which actuation of the rear impact occupant protection device 40 is desirable. For example, the rear impact function 70 provides a HIGH output for a rear impact crash event in which actuation of the rear impact restraint 40 is desirable. A LOW output is provided when there is no rear impact crash event requiring actuation of a rear impact occupant protection device 40. A threshold for determining the occurrence of a rear impact crash event may be based upon empirical testing with an appropriate vehicle. The threshold data may be stored in the controller 44, such as in a look-up table.

The output of the rear impact function 70 is provided to another input of the Boolean AND function 68. When the comparison function 66 and the rear impact function 70 are both HIGH, the output of the AND function 68 is HIGH. This indicates both a proper occupant position and a rear impact crash event. At a HIGH output from the AND function 68, the controller 44 provides an actuate restraint function 72 for actuating the rear impact occupant protection device 40. It will be understood that additional logic may be employed to provide for variable amounts of actuation of the protection devices in response to the rear impact sensor signal and the occupant position signals.

If the comparison function 66 provides a LOW output, indicating either no vehicle occupant in the seat 12 or an out of position occupant, the controller 44 may provide a warning signal function 74. The warning signal function 74 provides a signal to an alarm device 76, which may provide an audible, visual and/or tactile alarm, such as from a known device on the vehicle instrument panel. The alarm notifies a vehicle occupant, such as the vehicle driver 42, that an occupant or an occupant's seat may be out of position.

The foregoing example, as illustrated in FIG. 2, focuses on the operation of the system 10 with respect to the driver-side seat 12. It will be understood and appreciated that the system 10 operates in a substantially similar manner for any number of seats, including the rear seat 39 and the front passenger seat (not shown).

Figure 3:
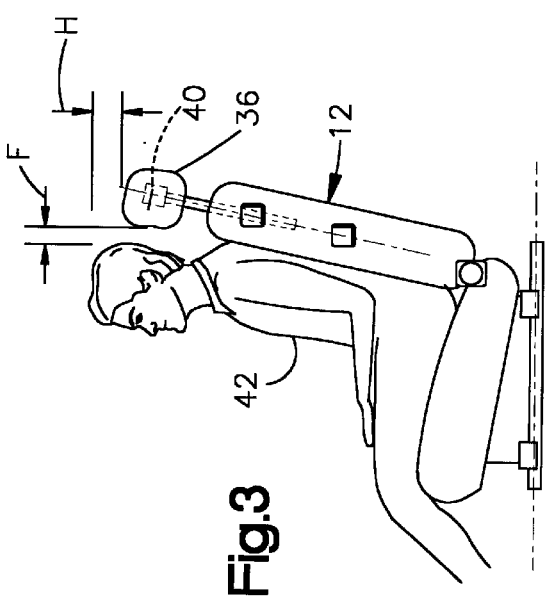
FIGS. 3–6 are partial side elevations of alternative conditions of the system of FIG. 1.
Figure 7:
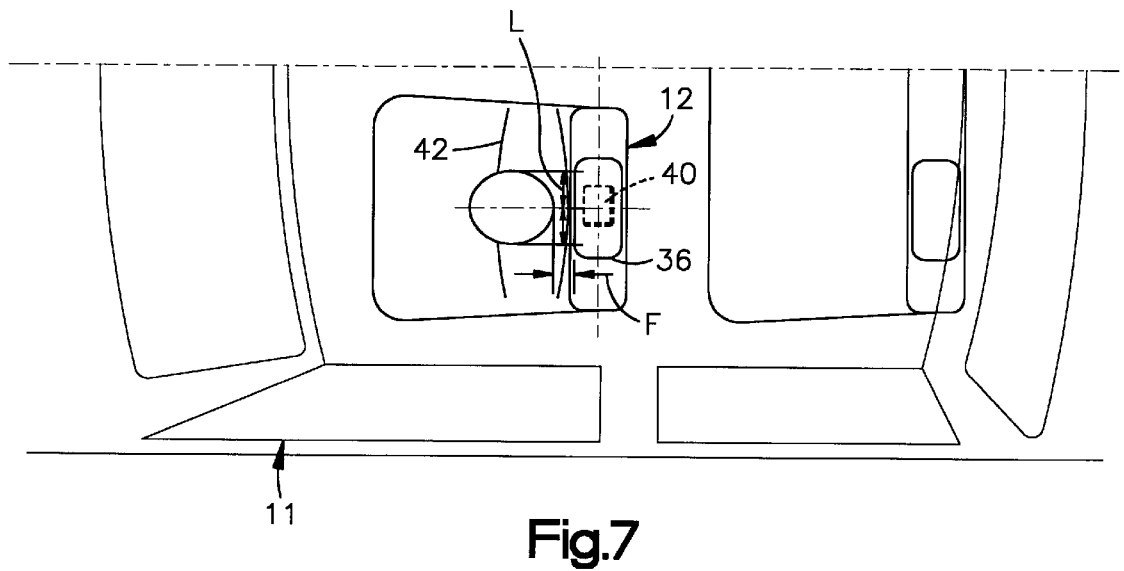
FIGS. 7 and 8 are partial top views of alternative conditions of the system of FIG. 1.

FIGS. 3 and 7 illustrate examples of the occupant 42 positioned on the seat 12 in which the occupant's relative position with respect to the seat 12 is within desirable actuating parameters. Specifically, the front-to-aft distance, indicated at F, between the occupant's head and the headrest 36 of the seat 12 is within a predetermined range. The relative vertical distance, indicated at H, between the head of the vehicle occupant 42 and the top portion of the headrest 36 also is within a predetermined range. In FIG. 7, the occupant's head is shown to be aligned laterally with the center of the headrest 36 and the protection device 40. Specifically, the lateral distance, indicated at L, from the center of the headrest 36 to the side of the occupant's head is within a predetermined operating range. With the occupant 42 positioned as illustrated in FIGS. 3 and 7, the comparison function 66 would provide a HIGH output. Accordingly, the controller 44 would actuate the protection device 40 in response to the rear impact sensor 60 providing a signal indicating the occurrence of a rear impact crash event. The particular operating thresholds for the distances F, H and L depend upon the type and location of the protection device 40 and the particular vehicle configuration.

Figure 4:
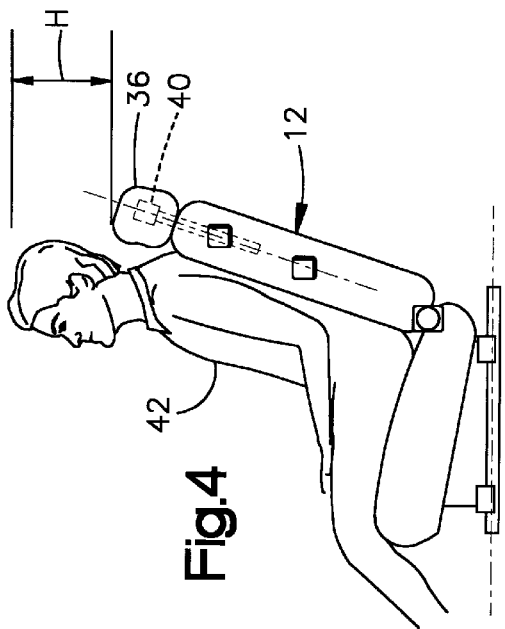
Figure 5:
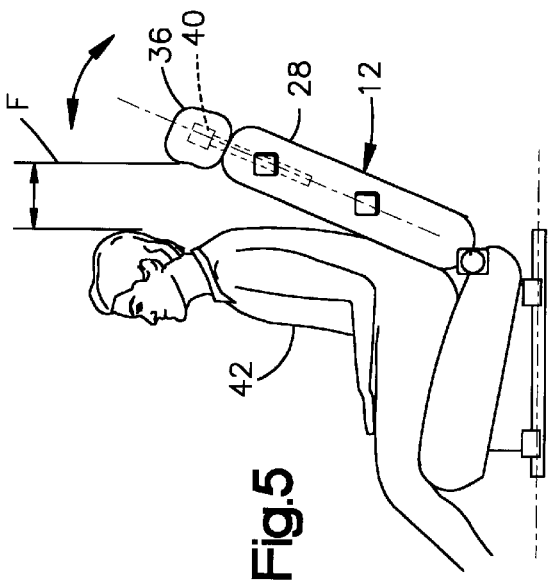
Figure 8:
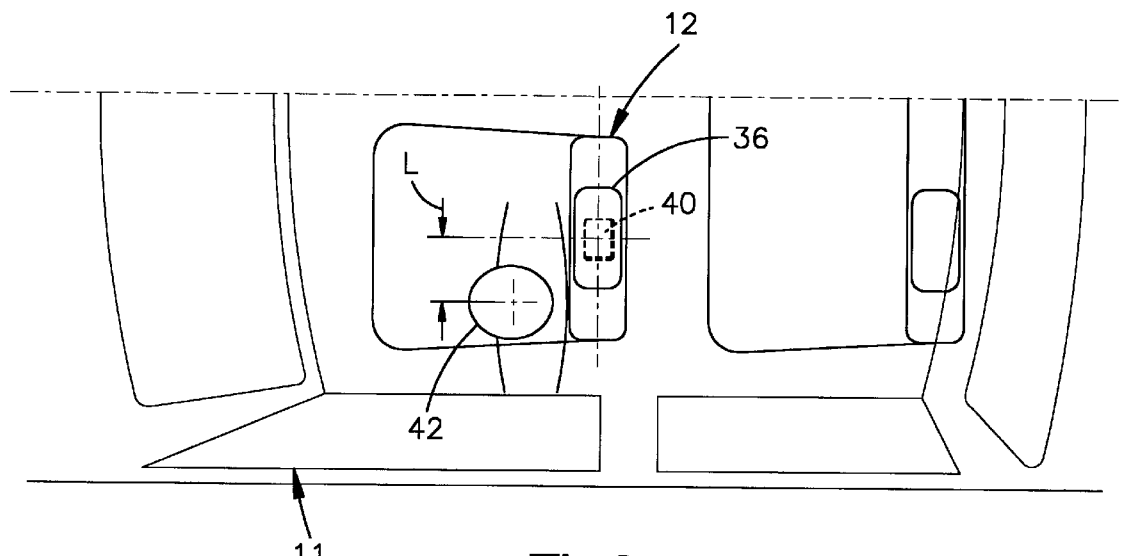

FIGS. 4, 5 and 8 illustrate exemplary situations in which the rear impact device 40 is disabled, as actuating the protection device 40 might not be beneficial to the occupant 42 on the seat 12. In FIG. 4, the controller 44 determines a relative vertical height H, which is beyond the predetermined threshold for actuating the protection device 40. The protection device 40 is thus disabled during such improper positioning. In this situation, the controller 44 also may provide a warning signal to an appropriate alarm device 76, such as set forth above. In response to activation of the alarm device 76, the occupant 42 might raise the headrest 36 to an appropriate position to reduce the relative vertical distance H.

In FIG. 5, the relative front-to-aft distance F is beyond the predetermined threshold for actuating the protection device 40. The restraint thus is disabled. Again, the controller 44 may provide a warning signal to actuate the alarm device 76, as shown in FIG. 2. In this situation, the vehicle occupant 42 also may receive instructions to rotate the seat back portion 28 towards the front of the vehicle 11 to reduce the relative front-to-aft distance F.

FIG. 8 illustrates a partial top view of the system 10 to show the relative lateral positioning L of the head of the occupant 42 with respect to the headrest 36. Specifically, the vehicle occupant 42 is shifted to the left, such that the occupant's head is not aligned with the headrest 36 and the protection device 40. Accordingly, the rear impact occupant protection device 40 is disabled while the relative lateral positioning L is improper. In this situation, the controller 44 also might provide a warning signal to actuate the alarm device 76 to notify the occupant 42 that the occupant 42 is out of position, as shown in FIG. 2.

Figure 6:
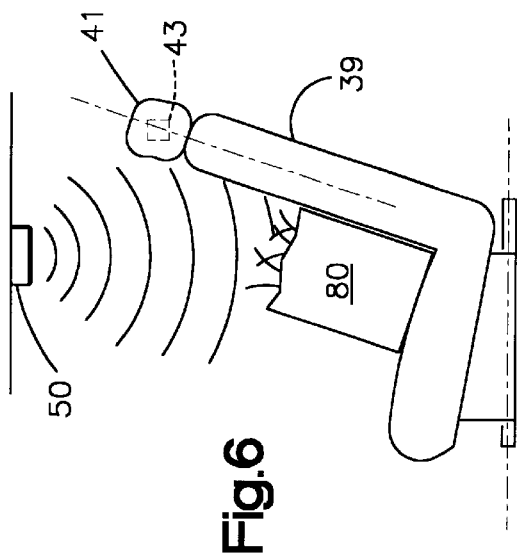

FIG. 6 illustrates an example in which a shopping bag 80, instead of a vehicle occupant, is positioned on the rear seat 39. The sensor 50 provides a signal to the controller 44, which disables the rear seat occupant protection device 43. The system 10 preferably is configured to distinguish between a vehicle occupant, which may be out of position, and an inanimate object for which no rear impact protection device is required. This determination is based upon the signals from the sensors 50 and/or 52. Accordingly, for an inanimate object, such as the package 80, the controller 44 does not provide a warning signal to activate an alarm device.

From the above description of the invention, those skilled in the art will perceive improvements, changes and modifications. Such improvements, changes and modifications within the skill of the art are intended to be covered by the appended claims.

Having described the invention, the following is claimed:

1. A rear impact restraint system for protecting a vehicle occupant during a rear impact crash event, said system comprising:

a vehicle seat having a seat back portion;

an actuatable rear impact occupant protection device for, when actuated, protecting a vehicle occupant during a rear impact crash event;

a first sensor for sensing the position of an occupant positioned on said vehicle seat, said first sensor providing a signal indicative of the position of the occupant;

a rear impact sensor for sensing a rear impact crash event and providing a signal indicative of said rear impact crash event; and a controller, in response to said first sensor signal, determining a condition according to the relative position of the occupant with respect to the position of said vehicle seat, said controller selectively actuating said rear impact occupant protection device in response to said rear impact sensor signal and said condition, said seat back portion comprising an upper end, a lower end and a seat back axis extending through said upper and lower ends of said seat back portion, said vehicle seat further comprising a headrest at said upper end of said seat back portion, said controller determining said condition according to the relative position of the occupant with respect to said headrest.

2. The system of claim 1 wherein said headrest has a side portion proximate the occupant, said controller determining said condition according to the relative position of the occupant with respect to said proximate side portion of said headrest.

3. The system of claim 1 wherein said headrest is vertically adjustable along said seat back axis.

4. The system of claim 1 wherein said rear impact occupant protection device is part of said headrest.

5. The system of claim 1 wherein said first sensor senses a vertical position of the occupant, said controller determining said condition according to the relative vertical position of the occupant with respect to said headrest.

6. The system of claim 1 wherein said first sensor senses a front-to-aft position of the occupant, said controller determining said condition according to the relative front-to-aft position of the occupant with respect to said headrest.

7. The system of claim 1 wherein said first sensor senses a lateral position of the occupant, said controller determining a condition according to the relative lateral position of the occupant with respect to said headrest.

8. The system of claim 1 wherein said controller comprises means for determining a position of said headrest of vehicle seat, and said controller comparing said headrest position and the occupant position to determine said condition according to the relative position of the occupant with respect to said headrest.

9. The system of claim 1 wherein said first sensor comprises a plurality of sensing devices for sensing a plurality of parameters relating to the position of the occupant.

\* \* \* \* \*